Dec. 3, 1929.  A. L. WALLACE  1,738,216
QUICK ACTING COUPLING
Filed March 27, 1926
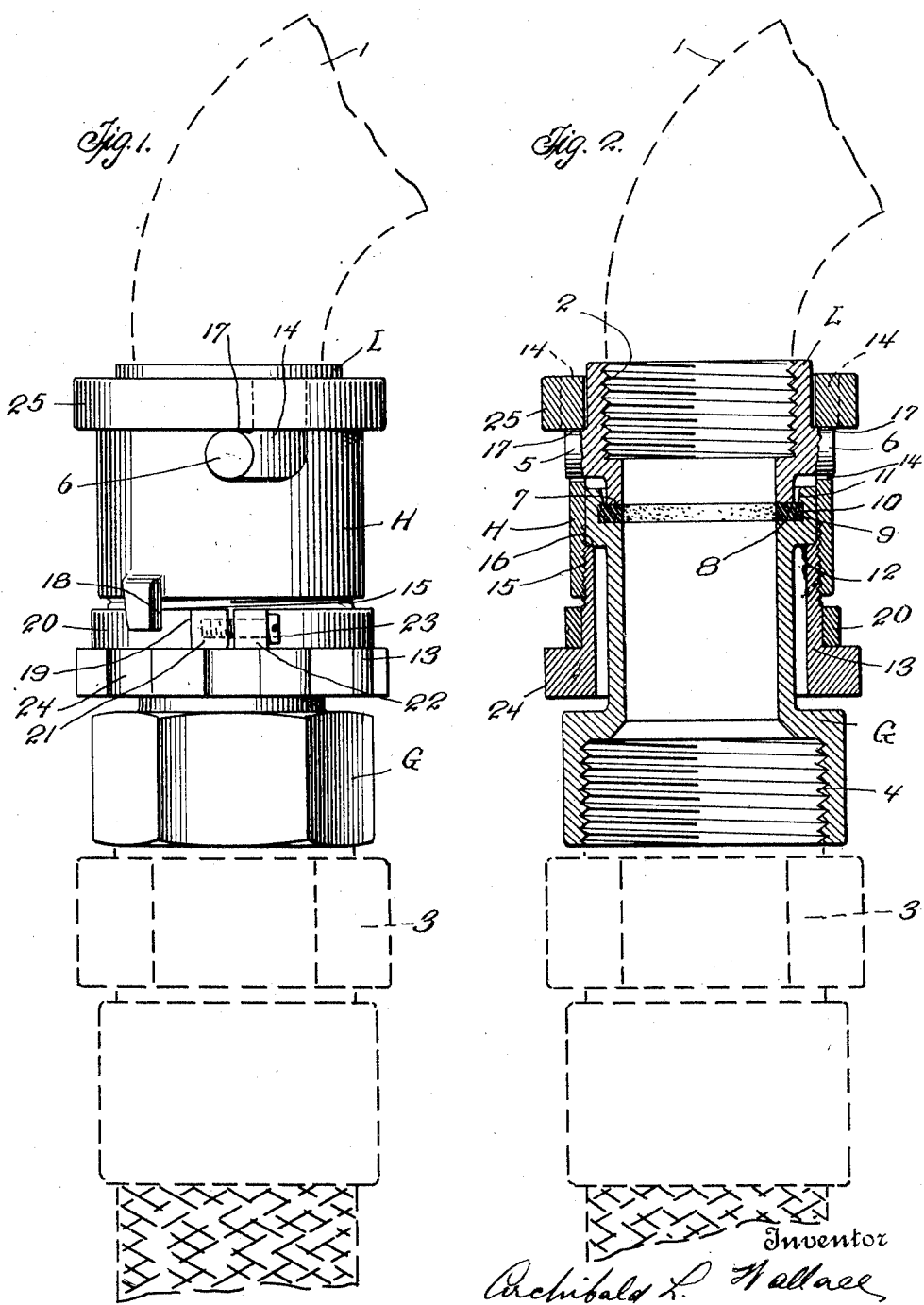

Patented Dec. 3, 1929

1,738,216

UNITED STATES PATENT OFFICE

ARCHIBALD L. WALLACE, OF BROOKLYN, NEW YORK, ASSIGNOR TO METAL HOSE & TUBING CO. INC., OF BROOKLYN, NEW YORK, A CORPORATION OF NEW YORK

QUICK-ACTING COUPLING

Application filed March 27, 1926. Serial No. 97,828.

This invention relates to a quick acting coupling, that is to a coupling by the use of which two sections of hose, pipe, or other conductor, may be readily connected and disconnected and in which the operation of connecting and disconnecting may be quickly performed.

An object of the invention is to provide a coupling of this character in which the connection although quickly effected will be of high efficiency.

A further object is to provide a coupling of the character indicated which will be of simple construction, cheap to manufacture and in which the connection may be easily and efficiently effected by simple manual manipulation of the parts.

A further object is to provide a coupling in which the parts which are to be coupled are first brought into coupled relation to each other and in which a subsequent simple manual manipulation of a part thereof will effect a tight and efficient seal between the coupled parts.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a coupling constructed in accordance with this invention and showing the same in association with a dotted line representation of conductor parts which are to be connected together, and Fig. 2 is a vertical central sectional view through the coupling seen in Fig. 1.

Referring to the drawing for describing in detail the structure therein illustrated the reference character L indicates what will for convenience be termed an upper member while the reference character G indicates what will be termed the lower member, of the coupling.

The upper member L is intended to be fixedly connected with one of the conductor parts, as for instance the pipe or like part 1, the connection being effected by means of interengaging threads as 2 provided upon the parts L and 1.

The lower member G is intended to be fixedly connected with the other conductor element, as the hose nozzle 3, the connection being effected by means of interengaging threads as 4 provided upon the parts G and 3.

The threads 2 and 3 upon the members or parts L and G may be either internal or external as may be required, but are here illustrated as being internal threads in both instances.

The upper member L is shaped to provide a pair of oppositely disposed lugs 5 and 6 thereon and an annular sealing part 7 at its lower open end.

The lower member G is formed with an annular shoulder 8 at its upper end upon which rests a sealing gasket 9 the upper surface of which is exposed and arranged for engagement by the sealing portion 7 of the member L. The gasket is preferably normally retained in position by being received in an annular groove 10 provided within the member G and slightly overhanging the upper surface of the gasket, the overhanging portion, as 11, incidently serving as an annular guide to direct and retain the sealing portion 7 of member L in proper relation to the gasket.

The member G is shaped also to provide an outstanding downwardly facing annular shoulder 12 exteriorly at its upper end.

Loosely arranged about the member G, and adapted to engage the shoulder 12 is a collar 13, and connected with this collar is a second collar as H which extends above the upper end of member G and is provided with a pair of bayonet slots 14—14 therein arranged to receive the lugs 6.

The collars 13 and H are provided with cooperative threads as 15 by which said collars are adjustably connected together in such manner that relative rotation of the collars will alter the distance between the upper end or shoulder portion 16 of collar 13 and the under side as 17 of the horizontal legs of the bayonet slots 14, the threads 15 being quite fine in order that this adjustment may be performed with the requisite accuracy.

A suitable stop as 18 is provided upon the collar H and a co-operative stop 19 is provided upon the collar 13, said stops being adapted to abut together for limiting relative rotation of the collars at all times, and in order that the limits provided by stops 18 and 19 may be altered, as for instance to compensate for wear of the parts, one of the stops, as for instance the stop 19 on the collar 13, is rotatably adjustable upon said collar 13. In the structure illustrated the collar 19 is formed upon a separate band 20 which encircles the collar 13 and which has opposite ends as 21 and 22 connected together by a clamp screw 23. To adjust the stop 19 it is simply necessary to loosen the screw 23, rotate the band 20 to the desired extent and then again tighten the screw 23.

Each of the collars 13 and H are provided with annular hand grip portions as 24 and 25 respectively by which they may be manually engaged to effect inter-rotation as required.

When it is desired to utilize this coupling the operation is as follows: Bearing in mind that the upper member L of the coupling is rigidly connected with the conductor part 1 and the lower member G, carrying collars 13 and H, is rigidly connected to and movable with the other conductor member as 3, the coupling members are brought roughly together, the lugs 5 and 6 passing into the bayonet slots 14, and the sealing portion 7 engaging loosely with the gasket 9. At this time the collars 13 and H are in position with the stops 18 and 19 in engagement with each other, and hence with the shoulders 16 and 17 spaced their full distance apart so that the introduction of the lugs into the bayonet slots is a simple and easy operation. With the two members of the coupling now roughly assembled the collars 13 and H are rotated relative to each other so as to separate the stops 18 and 19 thus causing the collars to screw toward each other and hence reduce the distance between the shoulders 16 and 17. The required inter-rotation of the collars may be quite slight, usually about a quarter turn, when the sealing portion 7 of the upper coupling member will be forced into tight sealing engagement with the gasket 9.

It will be understood that in the instance illustrated the band 20 will be placed so that the stop 19 thereof will allow just the proper amount of inter-rotation between the two collars to permit of easy initial engagement of the two coupling members L and G without requiring excessive inter-rotation of said collars in order to bring the coupling members to their sealing position, and that in the event of wear of the gasket, or of the shoulders 16 or 17, or of the parts which engage said shoulders, the band 20 will be rotatably adjusted to place the stop 19 again in its most desirable position.

As many changes could be made in this construction without departing from the scope of the invention, as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. In a quick acting coupling, comprising two separate coupling members intended to be coupled together, a collar surrounding one of said coupling members having bayonet slot connection therewith, a part providing a shoulder upon said collar engaging the other coupling member in opposition to said bayonet slot connection, and means whereby said part is adjustable upon said collar to act upon the bayonet slot connection for moving the two coupling members into tight engagement with each other, the combination therewith of stop means co-operative between said collar and said part to limit relative movement of said part with respect to said collar, said stop means comprising a pair of abutments one carried by said collar and the other by said part arranged to engage against each other and means whereby one of said abutments is adjustable in a direction rotatively about the longitudinal axis of the coupling said means being operable to hold the adjustable abutment in any rotative adjusted position.

2. In a quick acting coupling, comprising two separate coupling members intended to be coupled together, a collar surrounding one of said coupling members having bayonet slot connection therewith, a part providing a shoulder upon said collar engaging the other coupling member in opposition to said bayonet slot connection, and means whereby said part is adjustable upon said collar to act upon the bayonet slot connection for moving the two coupling members into tight engagement with each other, the combination therewith of stop means co-operative between said collar and said part to limit relative movement of said part with respect to said collar, said stop means comprising an abutment carried by said collar and a second abutment carried by said part, and one of said abutments consisting of a band encircling its carrying element and adjustably clamped thereonto for the purpose set forth.

In testimony whereof I affix my signature.

ARCHIBALD L. WALLACE.